United States Patent [19]

Houlihan

[11] 3,927,018

[45] Dec. 16, 1975

[54] 3-(2-METHYL-1-IMIDAZOLYL)-3-PHENYL-1-(3H)ISOBENZOFURANONES

[75] Inventor: William J. Houlihan, Mountain Lakes, N.J.

[73] Assignee: Sandoz, Inc., E. Hanover, N.J.

[22] Filed: Dec. 23, 1974

[21] Appl. No.: 535,438

[52] U.S. Cl. ...... 260/309; 260/346.2 R; 260/544 M; 424/273
[51] Int. Cl.² ........................................ C07D 405/04
[58] Field of Search ...................................... 260/309

[56] References Cited
UNITED STATES PATENTS 3,549,646  12/1970  Hamilton et al. ............... 260/293.72

OTHER PUBLICATIONS

Biswas et al., Tetrahedron, Vol. 25, pp. 227, 232 and 237–239 relied on, 1969.
Rees et al., J. Chem. Soc. (London), 1965, pp. 687–691.

*Primary Examiner*—Natalie Trousof
*Attorney, Agent, or Firm*—Gerald D. Sharkin; Robert S. Honor

[57] ABSTRACT

Substituted isobenzofuranones, e.g., 3-(2-methyl-1-imidazolyl)-3-phenyl-1-(3H)isobenzofuranone, are prepared by reacting a corresponding substituted 2-benzoylbenzoyl chloride with a 2-methylimidazole and are useful as anti-inflammatory agents.

5 Claims, No Drawings

3-(2-METHYL-1-IMIDAZOLYL)-3-PHENYL-1-(3H)ISOBENZOFURANONES

This invention relates to substituted isobenzofuranones. More particularly, it relates to 3-(2-methyl-1-imidazolyl)-substituted isobenzofuranones, processes for their preparation and pharmaceutically acceptable acid addition salts thereof.

The compounds of this invention may be represented by the following structural formula:

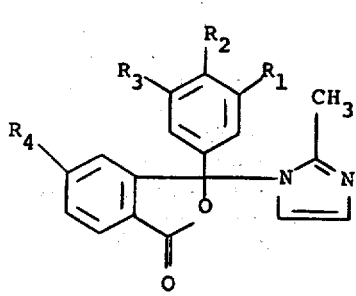

where
- $R_1$, $R_2$, and $R_3$ each independently represent hydrogen, halo having an atomic weight of about 19 to 36, lower alkyl, i.e., alkyl having 1 to 4 carbon atoms, e.g., methyl, ethyl, isopropyl and the like, lower alkoxy, i.e., alkoxy having 1 to 4 carbon atoms, e.g., methoxy, ethoxy, isopropoxy and the like, trifluoromethyl, or
- $R_1$ and $R_2$ together on adjacent carbon atoms may represent methylenedioxy, and
- $R_2$ and $R_3$ together on adjacent carbon atoms may represent methylenedioxy,
- $R_4$ represents hydrogen, halo having an atomic weight of about 19 to 36 or lower alkyl, i.e., alkyl having 1 to 4 carbon atoms, e.g., methyl, ethyl and the like, provided that $R_2$ is trifluoromethyl or t-butyl only when $R_1$ and $R_3$ are other than trifluoromethyl or t-butyl.

Another aspect of this invention is concerned with compounds in which $R_4$ is hydrogen.

The compounds of formula (I) may be prepared according to the following reaction scheme:

X represents chlorine or bromine, and
$R_1$, $R_2$, $R_3$, $R_4$ and the proviso are as defined above.

The compounds of formula (I) are prepared by reacting a compound of the formula (II) with a compound of the formula (III) in the presence of an organic acid binding agent such as the trialkylamines, e.g., trimethylamine, triethylamine and the like, or an excess of a compound of formula (III), the latter being especially preferred, and an inert organic solvent. Although the particular solvent employed is not critical, the preferred solvents include the dialkylformamides, such as dimethylformamide, diethylformamide, and the like, or N-methylpyrrolidone, preferably dimethylformamide. The temperature of the reaction is not critical, but it is preferred that the reaction be carried out between about 20° to 60°C., preferably from about 20° to 30°C. The reaction is run from about 12 to 60 hours, preferably from about 40 to 50 hours. The resulting product is recovered using conventional techniques, e.g., filtration followed by recrystallization.

It will be appreciated that the compounds of formula (II) may exist in the form of its tautomer, having the following structural formula:

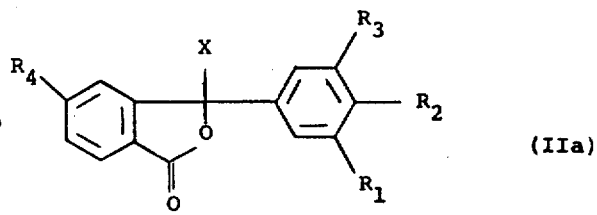

(IIa)

where
X, $R_1$, $R_2$, $R_3$ and $R_4$ are as defined above.

In the present disclosure, only the tautomer of formula (II) is used, but it will be understood that both tautomeric forms are equivalent and that the present disclosure embraces both forms.

Certain of the compounds of formulae (II) and (III) are known and may be prepared by methods described in the literature. Those compounds of formulae (II) and (III) not specifically disclosed may be prepared by analogous methods from known starting materials.

The compounds of formula (I) are useful because

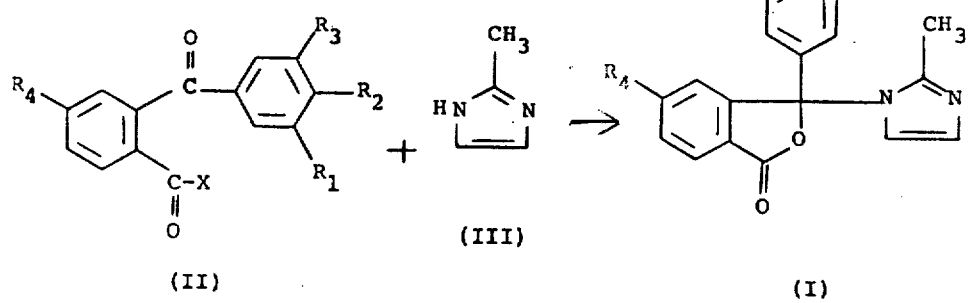

where they possess pharmacological activity in animals. In particular, the compounds of formula (I) are useful as anti-inflammatory agents, as indicated by their activity in rats dosed orally with 20 to 105 milligrams per kilogram of animal body weight of test compound using the acute carrageenan-induced edema procedure substantially as described by Winter (Proc. Soc. Exptl. Biol., 111:544, 1962).

When the compounds are employed for the above utility, they may be combined with one or more pharmaceutically acceptable carriers or adjuvants and may be administered orally in such forms as tablets, capsules, elixirs, suspensions and the like or parenterally in the form of an injectable solution or suspension. Depending upon the compound employed and the mode of administration, the exact dosage utilized may vary.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and, accordingly, are included within the scope of the invention. Representative of the acid addition salts are the mineral acid salts, such as the hydrochloride, hydrobromide, sulfate, phosphate and the like, and the organic acid salts, such as the succinate, benzoate, acetate, p-toluenesulfonate, benzenesulfonate and the like.

The anti-inflammatory effective dosage of the compounds of formula (I) will depend on the particular compound employed, the method of administration, and the severity of the condition being treated. In general, satisfactory results are obtained when these compounds are administered in the treatment of inflammations at a daily dosage of about 4 milligrams to about 200 milligrams per kilogram of animal body weight, preferably orally. This daily dosage is preferably administered 2 to 4 times a day or in sustained release form. For most large mammals, such as primates, the total daily dosage is from about 300 milligrams to about 2000 milligrams. Dosage forms suitable for internal use comprise from about 75 milligrams to about 1000 milligrams of the active compound in intimate admixture with a solid or liquid pharmaceutically acceptable carrier or diluent.

A representative formulation suitable for oral administration 2 to 4 times a day in the treatment of inflammation is a capsule prepared by standard encapsulating techniques which contains the following:

| Ingredients | Weight (mg.) |
| --- | --- |
| 3-(2-methyl-1-imidazolyl)-3-phenyl-1-(3H)isobenzofuranone | 100 |
| Inert solid diluent (starch, lactose, kaolin) | 200 |

EXAMPLE 1

3-(2-methyl-1-imidazolyl)-3-phenyl-1(3H)isobenzofuranone

In a flask equipped with stirrer and condenser equipped with a tube to carry exhaust gas, there is added 113 g. (0.5 mole) 2-benzoylbenzoic acid, 113 ml of thionyl chloride and 500 ml of chloroform and 2 ml of dimethylformamide. The mixture is stirred and heated until the liberation of gas ceases. The excess thionyl chloride and chloroform is removed in vacuo. The resultant crude 2-benzoylbenzoyl chloride is added to a solution of 82.0 g. (1.0 mole) 2-methylimidazole in 350 ml. of anhydrous dimethylformamide. The solution is stirred for ca 48 hours at room temperature. The resultant solid is filtered off and recrystallized from isopropanol dimethylformamide to give 3-(2-methyl-1-imidazolyl)-3-phenyl-1(3H)isobenzofuranone, m.p. 199°–200°C.

Following the above procedure and using in place of 2-benzoylbenzoyl chloride an equivalent amount of
  a. 2-(p-fluorobenzoyl)-benzoyl chloride,
  b. 2-(p-chlorobenzoyl)-benzoyl chloride,
  c. 2-(p-methylbenzoyl)-benzoyl chloride,
  d. 2-(p-methoxybenzoyl)-benzoyl chloride,
  e. 2-(3,4-methylenedioxybenzoyl)-benzoyl chloride,
  f. 2-(m-trifluoromethylbenzoyl)-benzoyl chloride,
  g. 2-(3,5-dichlorobenzoyl)-benzoyl chloride,
  h. 2-(3,5-dimethylbenzoyl)-benzoyl chloride,
  i. 2-benzoyl-4-chlorobenzoyl chloride, or
  j. 2-benzoyl-4-methylbenzoyl chloride,
there is obtained
  a. 3-(2-methyl-1-imidazolyl)-3-(p-fluorophenyl)-1(3H)isobenzofuranone,
  b. 3-(2-methyl-1-imidazolyl)-3-(p-chlorophenyl)-1(3H)isobenzofuranone,
  c. 3-(2-methyl-1-imidazolyl)-3-(p-tolyl)-1(3H)isobenzofuranone,
  d. 3-(2-methyl-1-imidazolyl)-3-(p-anisyl)-1(3H)isobenzofuranone,
  e. 3-(2-methyl-1-imidazolyl)-3-(3,4-methylenedioxyphenyl)-1(3H)isobenzofuranone,
  f. 3-(2-methyl-1-imidazolyl)-3-(m-trifluoromethylphenyl)-1(3H)isobenzofuranone,
  g. 3-(2-methyl-1-imidazolyl)-3-(3,5-dichlorophenyl)-1(3H)-isobenzofuranone,
  h. 3-(2-methyl-1-imidazolyl)-3-(3,5-dimethylphenyl)-1(3H)-isobenzofuranone,
  i. 5-chloro-3-(2-methyl-1-imidazolyl)-3-phenyl-1(3H)isobenzofuranone, or
  j. 5-methyl-3-(2-methyl-1-imidazolyl)-3-phenyl-1(3H)isobenzofuranone, respectively.

The 3-(2-methyl-1-imidazolyl)-3-phenyl-1(3H)isobenzofuranone is an effective anti-inflammatory agent when orally administered to an animal suffering from inflammation at a dosage of 150 mg. four times per day.

What is claimed is:
1. A compound of the formula

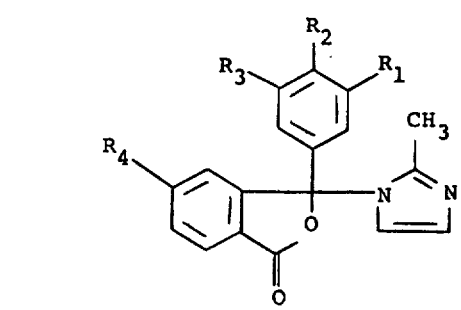

where $R_1$, $R_2$ and $R_3$ each independently represent hydrogen, halo having an atomic weight of about 19 to 36, lower alkyl having 1 to 4 carbon atoms, lower alkoxy having 1 to 4 carbon atoms, trifluoromethyl, or $R_1$ and $R_2$ or $R_2$ and $R_3$ together on adjacent carbon atoms may represent methylenedioxy, $R_4$ represents hydrogen, halo having an atomic weight of about 19 to 36, or lower alkyl having 1 to 4 carbon atoms, provided that $R_2$ is trifluoromethyl or t-butyl only when $R_1$ and $R_3$ are other than trifluoromethyl or t-butyl, or a pharmaceutically acceptable acid addition salt thereof.

2. A compound of claim 1 in free base form.

3. A compound of the formula

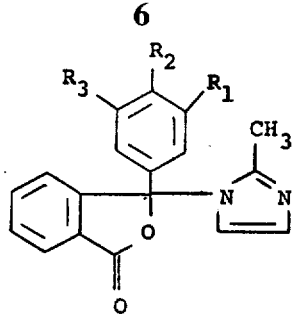

where $R_1$, $R_2$, $R_3$ and the proviso are as defined in claim 1, or a pharmaceutically acceptable acid addition salt thereof.

4. The compound of claim 1 which is 3-(2-methyl-1-imidazolyl)-3-phenyl-1(3H)isobenzofuranone.

5. The compound of claim 1 which is 3-(2-methyl-1-imidazolyl)-3-(p-fluorophenyl)-1(3H)isobenzofuranone.

* * * * *